United States Patent
Huang et al.

(10) Patent No.: US 9,584,033 B1
(45) Date of Patent: Feb. 28, 2017

(54) POWER SUPPLY DEVICE FOR VARYING AN OUTPUT VOLTAGE

(71) Applicant: CHICONY POWER TECHNOLOGY CO., LTD., New Taipei (TW)

(72) Inventors: Wen-Nan Huang, New Taipei (TW); Ming-Tsan Lin, New Taipei (TW); Ching-Guo Chen, New Taipei (TW); Shiu-Hui Lee, New Taipei (TW); Hsiao-Chih Ku, New Taipei (TW); Chih-Ming Yu, New Taipei (TW); Hsin-Chang Yu, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/886,694

(22) Filed: Oct. 19, 2015

(51) Int. Cl.
*H02M 3/335* (2006.01)
*H02M 1/00* (2006.01)

(52) U.S. Cl.
CPC ............ *H02M 3/33546* (2013.01); *H02M 2001/0009* (2013.01); *H02M 2001/0032* (2013.01)

(58) Field of Classification Search
CPC ..... H02M 3/33546; H02M 2001/0009; H02M 2001/0032; H02M 2001/0025
USPC ........... 363/21.04, 21.07, 21.1, 21.12, 21.15, 363/21.18; 323/282, 902
See application file for complete search history.

(56) References Cited

U.S. PATENT DOCUMENTS

| | | | | |
|---|---|---|---|---|
| 5,499,176 A * | 3/1996 | Erisman | ..... | H03F 3/38 323/902 |
| 5,903,452 A * | 5/1999 | Yang | ..... | H02M 3/33507 363/131 |
| 7,187,564 B2 * | 3/2007 | Tsuruya | ..... | H01F 38/08 363/21.04 |
| 2007/0047268 A1 * | 3/2007 | Djenguerian | ..... | H02M 3/33515 363/21.13 |
| 2008/0037296 A1 * | 2/2008 | Hsu | ..... | H02M 1/08 363/41 |
| 2010/0008108 A1 * | 1/2010 | Xiaowu | ..... | H02M 3/33523 363/21.15 |

(Continued)

FOREIGN PATENT DOCUMENTS

| TW | M299409 | 10/2006 |
|---|---|---|
| TW | M374229 | 2/2010 |

(Continued)

OTHER PUBLICATIONS

Texas Instrument, TL43xx Precision Programmable Reference, Aug. 2004—Revised Jan. 2015, pp. 1-74.*

*Primary Examiner* — Gary L Laxton
*Assistant Examiner* — Alex Torres-Rivera
(74) *Attorney, Agent, or Firm* — Muncy, Geissler, Olds & Lowe, P.C.

(57) ABSTRACT

A power supply device includes an output port, a transformer, a power switch, a current sensor, a voltage-dividing controller, a voltage-feedback unit, a voltage comparator, a main controller, and a pulse width modulator. The transformer has two inductances. The power switch is electrically connected to a primary winding of the transformer, the pulse width modulator, and the current sensor coupled to the voltage-dividing controller. The voltage-feedback unit is electrically connected to the voltage-dividing controller, the voltage comparator, and the output port. The main controller is coupled to the pulse width modulator and the voltage comparator.

9 Claims, 3 Drawing Sheets

(56) References Cited

U.S. PATENT DOCUMENTS

| | | | |
|---|---|---|---|
| 2011/0169476 A1 | 7/2011 | Ikriannikov et al. | |
| 2011/0248812 A1* | 10/2011 | Hu | H01F 29/14 336/221 |
| 2012/0155123 A1* | 6/2012 | Tang | H02M 3/33523 363/21.15 |
| 2013/0064566 A1* | 3/2013 | Kojima | H02M 3/33523 399/88 |
| 2014/0301117 A1* | 10/2014 | Hirabayashi | G03G 15/5004 363/21.15 |

FOREIGN PATENT DOCUMENTS

| | | |
|---|---|---|
| TW | 2012347485 | 8/2012 |
| TW | 201328418 | 7/2013 |
| TW | M513512 | 12/2015 |

* cited by examiner

POWER SUPPLY DEVICE FOR VARYING AN OUTPUT VOLTAGE

BACKGROUND OF THE INVENTION

Field of the Invention

The present disclosure relates to a power supply device. More particularly, the present disclosure relates to a power supply device for varying an output voltage according to a load current variation.

Description of Related Art

Many electronic products in the end-user electronics market are being manufactured so as to be switched between the standby mode and non-standby mode. The electronic product are designed to be switched to the standby mode and thereafter to wake and start up depending on the user's preference or any other external factor without any delay, besides the regular turn on and off functions thereof. In order to meet the powers required for operation of the electronic products under non-standby mode and standby mode, the commercial power supply includes two output ports for respectively provides standby power and non-standby power to the electronic products electrically connected thereto, wherein the potential level of the standby power is usually lower than that of the non-standby power. As such, the volume of the power supply is bulky and expensive.

The commercial power supply only provides the non-standby power via one of the output ports when the electronic products are operated under non-standby mode. Conversely, the commercial supply provides the standby power via the other output port not only when the electronic product are operated under non-standby mode, but also when the electronic products are operated under standby mode. As such, the power consumption of the power supply is increased during the electronic products is operated under non-standby mode.

SUMMARY OF THE INVENTION

An object of the present invention is to provide a power supply device which is flexible and operates in an efficient manner for different load conditions. More particular, the power supply device includes a single output port for providing electric powers to an electronic product electrically connected thereto to meet the requirements of the electronic product during a standby mode operation and a non-standby mode operation.

Accordingly, the power supply device includes an output port is electrically connected to an electronic product includes a power source, a transformer, a power switch, a current sensor, a voltage-dividing controller, a voltage-feedback unit, a voltage comparator, a main controller, and a pulse width modulator. The transformer includes a primary winding and a secondary winding coupled to each other. The primary winding is electrically connected to the power source, and the secondary winding is electrically connected to the output port. The transformer has a first inductance and a second inductance smaller than the first inductance. The power switch is electrically connected to the primary winding and the power source. The current sensor is electrically connected to the power sensor. The voltage-dividing controller is electrically connected to the current sensor. The voltage-feedback unit is coupled to the voltage-dividing controller and the output port. The voltage comparator is electrically connected to the voltage-feedback unit. The main controller is electrically connected to the voltage comparator. The pulse width modulator is electrically connected to the power switch and the main controller. The current sensor senses the current flowing through the primary winding to make the voltage-dividing controller generate a voltage-dividing-controlling signal for regulating a voltage outputted from the voltage-feedback unit, and the voltage comparator compares a potential level of the regulated voltage with a preset potential level, to generate a compared signal for modulating the duty cycle of the pulse width modulating signal outputted from the pulse width modulator, thus a output voltage from the output port is regulated.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
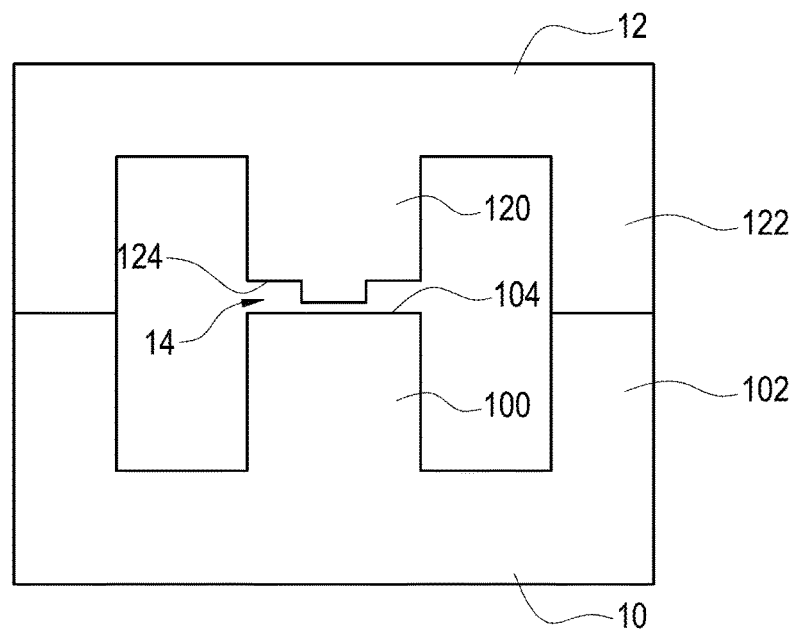
FIG. 1 is a cross-sectional view of a magnetic core assembly of a transformer according to an embodiment of the present disclosure.

Reference will now be made in detail to the embodiments of the present invention, examples of which are illustrated in the accompanying drawings, wherein like reference numerals refer to like elements throughout. The embodiments are described below so as to explain the present invention by referring to the figures.

A power supply device including a single output port and is electrically connected to an electronic product for providing output voltages to meet the requirements of the electronic product during a light load operation (or called standby mode operation) and a non-light load operation (or called non-standby mode operation). More particular, during the electronic product is operated under the light load operation, the power supply device provides the output voltage with a first potential level thereto, and during the electronic product is operated under the non-light load operation, the power supply device provides the output voltage with a second potential level thereto, wherein the second potential level is different from the first potential level, and the magnitude of the second potential level is higher than the first potential level.

Reference is made to FIG. 1, which is a cross-sectional view of a magnetic core assembly of a transformer according to an embodiment of the present invention. The magnetic core assembly includes a first magnetic core 10 and a second magnetic core 12. The first magnetic core 10 and the second magnetic core 12 are, for example, made of ferrite material.

In FIG. 1, the first magnetic core 10 and the second magnetic core 12 each has the shape of E. The first magnetic core 10 includes a first central leg 100 and two first outer legs 102 connected to two opposite sides of the first central leg 100. The first central leg 100 further includes a first end face 104 being a plane. The second magnetic core 12 includes a second central leg 120 and two outer legs 122 connected to two opposite sides of the second central legs 122. The second central leg 120 further includes a second end face 124 being not a plane.

The first outer legs 102 of the first magnetic core 10 are attached to the second outer legs 122 of the second magnetic core 12, the first end face 104 of the first central leg 100 faces the second end face 124 of the second magnetic core 12, and the first end face 104 and the second end face 124 are slightly spaces from one another to defined an air gap 14 therebetween. The air gap 14 is a non-linear air gap since the second end face 124 of the second central leg 120 is not a plane. In FIG. 1, the air gap 14 is a bi-stepped air gap. However, in the practical application, not only the first end face 104 but also the second end face 124 can be not a plane, thus a multi-stepped air gap is defined between the first end face 104 and the second end face 124.

Figure 2:
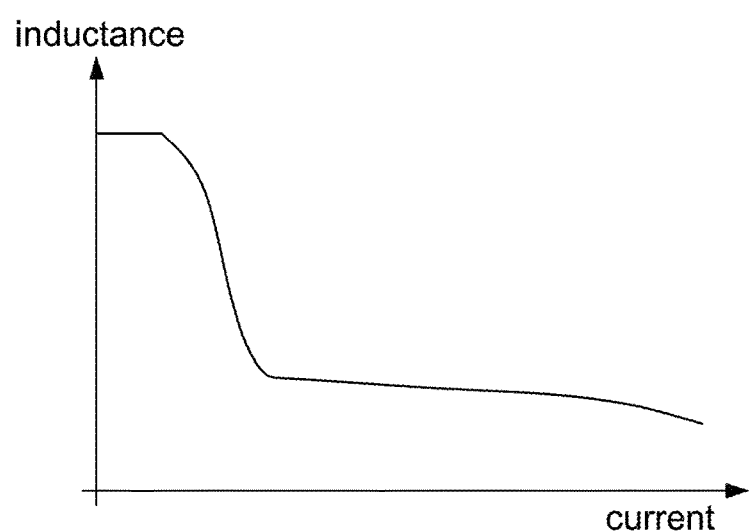
FIG. 2 shows a graph of the relationship between the inductance and current flowing through the secondary winding of the transformer.
Figure 3:
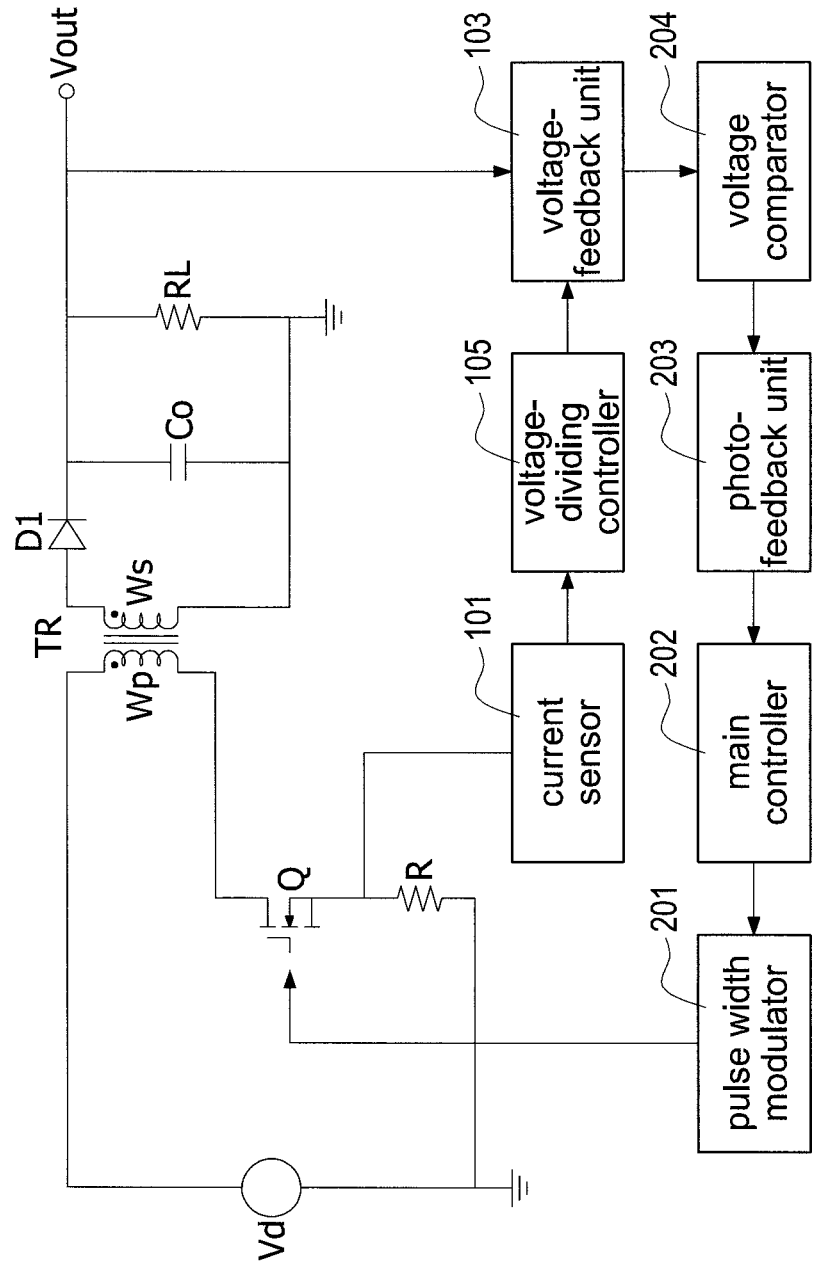
FIG. 3 is a circuit block diagram of a power supply device according to the embodiment of the present invention.

As can be seen in FIG. 3, a primary winding Wp and a secondary winding Ws are wound on the magnetic core, and thus a transformer TR is then formed. The air gap 14 between the first end surfaces 104 and the second end face 124 is designed so that the magnetic core becomes partially saturated under specific condition (described in more detail below), and then the inductance of the transformer TR is modulated. In particular, according to the designation of the air gap 14 of the magnetic core, the transformer has a first inductance and a second inductance smaller than the first inductance. The transformer TR has the first inductance is employed in the light load operation since the excited current and energy stored therein are low, thereby reducing output voltage and /or output current. Conversely, the transformer TR has the second inductance is employed in the non-light load operation since the excited current and energy stored therein are low, thereby increasing output voltage and/or current, the relationship between the inductance and current flowing through the secondary winding of the transformer is shown in FIG. 2.

Reference is made to FIG. 3, which is a circuit block diagram of the power supply device according to the embodiment of the present invention. For sake of convenient explanation, FIG. 3 also illustrates load RL. The load RL is the electronic product mentioned above, and the electronic product is electrically connected to the output port Vout of the power supply device. The power supply device includes a power source Vd, the transformer TR, a power switch Q, a resistor R, a rectifier D1, a filter Co, a current sensor 101, a voltage-feedback unit 103, a voltage-dividing controller 105, a pulse width modulator 201, a main controller 202, a photo-feedback unit 203, and a voltage comparator 204.

The transformer TR includes the primary winding Wp and the secondary winding Ws coupled with each other. One terminal of the primary winding Wp is connected to the high potential terminal of the power source Vd, and the other terminal thereof is connected to the power switch Q. In FIG. 3, the power switch Q is a metal-oxide-semiconductor field-effect transistor (MOSFET), the drain of the power switch Q is electrically connected to the primary winding Wp, and the gate thereof is electrically connected to the pulse width modulator 201. The source of the power switch Q is not only electrically connected to the current sensor 101, but also electrically connected to the low potential terminal of the power source Vd.

The rectifier D1 is arranged between the secondary winding Ws of the transformer TR and the filter Co and electrically connected thereto. In FIG. 3, the rectifier D1 is a diode, the filter Co is a capacitor, the anode of the diode D is connected to the secondary winding Ws, and the cathode thereof is connected to the output port Vout.

The voltage-diving controller 105 is arranged between the current sensor 101 and the voltage-feedback unit 103 and electrically connected thereto. The voltage-feedback unit 103 is further electrically connected to the output port Vout and the voltage comparator 204.

The photo-feedback unit 203 is arranged between the main controller 202 and the voltage comparator 204 and electrically connected thereto. The pulse width modulator 201 is arranged between the main controller 202 and the power switch Q and electrically connected to the main controller 202 and the gate of the power switch Q.

Figure 4:
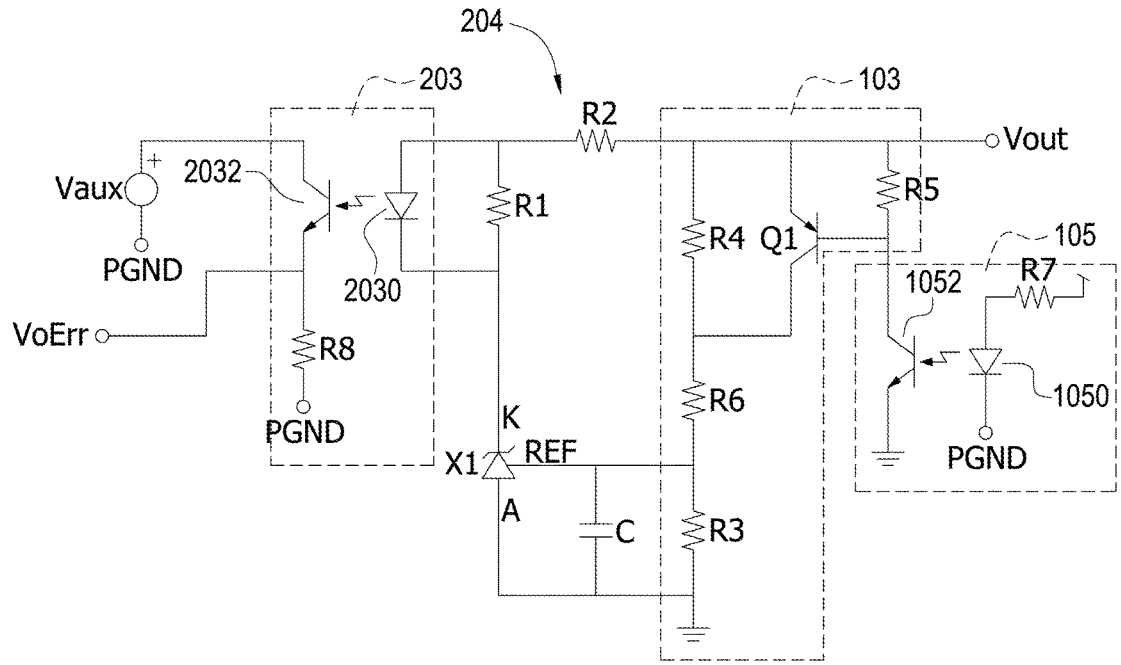
FIG. 4 is a circuit diagram illustrating the voltage-feedback unit, the voltage-dividing controller, the photo-feedback unit, and the voltage comparator of the power supply device shown in FIG. 3.

Reference is made to FIG. 3 and FIG. 4, wherein circuit diagram illustrating the voltage-feedback unit, the voltage-dividing controller, the photo-feedback unit, and the voltage comparator of the power supply device shown in FIG. 3. The voltage comparator 204 includes a main switch X1, a first resistor R1, a second resistor R2, and a capacitor C. As can be seen in FIG. 4, the main switch X1 is a TL431 type voltage regulator, the cathode of the main switch X1 is electrically connected to the first resistor R1, and the anode thereof is electrically connected to ground. The second resistor R2 is electrically connected to the first resistor R1 and the output port Vout. The capacitor C is across the anode and the reference terminal of the main switch X1. When the main switch X1 is turned on, the potential level across the luminous component 2030 of the photo-feedback unit 203 is changed.

The voltage-feedback unit 103 includes a transistor switch Q1, a third resistor R3, a fourth resistor R4, a fifth resistor R5, and a sixth resistor R6. The third resistor R3 is electrically connected to the capacitor C in parallel. As can be seen in FIG. 4, the transistor switch Q1 is a bipolar transistor, and the emitter of the transistor switch Q1 is electrically connected to the second resistor R2 and the output port Vout. The fourth resistor R4 is across the emitter and collector of the transistor switch Q1, and the fifth resistor R5 is across the emitter and base of the transistor switch Q1. The sixth resistor R6 is arranged between the third resistor R3 and the fourth resistor R4 and electrically connected thereto.

The voltage-dividing controller 105 includes a light-generating component 1050 and a light-receiving component 1052, the light-receiving component 1052 is electrically connected to the base of the transistor switch Q1, and the light-generating component 1050 is electrically connected to the current sensor 101 through the seventh resistor R7. The voltage-feedback controller 105 is configured to switch the transistor switch Q1 between on and off, and the primary side (where the primary winding Wp arranged) of the transformer TR is isolated from the secondary side (where the secondary winding Ws arranged) thereof on the path by the voltage-feedback unit 105.

The photo-feedback unit 203 includes an eighth resistor R8 and an optical-isolator (its reference numeral is omitted) including the luminous component 2030 and a photosensitive component 2032 optically coupled with each other, and the luminous component 2030 is electrically connected to the first resistor R1 in parallel. As can be seen in FIG. 4, the luminous component 2030 is a light emitting diode, the photosensitive component 2032 is a phototransistor, and the emitter of the photosensitive component 2032 is electrically connected to the eighth resistor R8 and the main controller 202. The primary side (where the primary winding Wp arranged) of the transformer TR is isolated from secondary side (where the secondary winding Ws arranged) thereof on the path by the photo-feedback unit 203.

With referring again to FIG. 3, the power switch Q is switched on or off according to the pulse width modulating signal outputted from the pulse width modulator 201. When the duty cycle of the pulse width modulating signal is a constant and the output current provided from the output port Vout is increased, the magnetic flux of the transformer TR is added and, consequently, the inductance of the transformer TR is decreased so that the current flowing through the primary side of the power supply device is increased. In contrast, when the output current is decreased while the duty cycle of the pulse width modulating signal is the constant, the magnetic flux of the transformer TR is decreased and, consequently, the inductance thereof is increased so that the current flowing through the primary side of the power supply device is decreased.

When the power switch Q is switched on, the current sensor 101 senses the current flowing through the primary winding Wp, and the sensed current is then switched into a high logic signal and a low logic signal by a comparator built in the current sensor 101, wherein the high logic signal and low logic signal respectively corresponds to the light load operation and non-light load operation of the load RL. The high logic signal and low logic signal outputted from the current sensor 101 is then transmitted to the light-generating component 1050 of the voltage-dividing controller 105 through the seventh resistor R7. When the load RL is under light load operation, the high logic signal is transmitted from the current sensor 101 to the voltage-dividing controller 105 to make the light-generating component 1050 switch on. As such, the light-receiving component 1052 receives light generated by the light-generating component 1050 and then transmits a controlling signal to the voltage-feedback unit 103. In contrast, when the load RL is under non-light load operation, the low logic signal is transmitted from the current sensor 101 to the voltage-dividing controller 105 to make the light-generating component 1050 switch off.

The transistor switch Q1 is switched on during the light-receiving component 1052 received light generated by the light-generating component 1050, thereby heightening the potential level of the reference terminal REF of the main switch X1. Since the potential level for conducting the main switch X1 by the reference terminal X1 is a constant, an effect equivalent to lower the output voltage is defined during the potential level of the reference terminal REF is increased.

The transistor switch Q1 is switched off during the light-receiving component 1052 does not receive light generated by the light-generating component 1050, thereby lower the potential level of the reference terminal REF of the main switch X1. Since the potential level for conducting the main switch X1 by the reference terminal X1 is the constant, an effect equivalent to heighten the output voltage is defined during the potential level of the reference terminal REF is decreased.

The power supply device of the present invention senses the current flowing through the primary side of the transformer TR, and determiners whether the power supply device is under light load operation or not to regulate the potential level of the voltage outputted from the voltage-feedback unit 106. The voltage comparator 204 compares the regulated voltage outputted from the voltage-feedback unit 106 with a preset voltage and makes the photo-feedback unit 203 send a compared signal to the main controller 202 arranged at the primary side of the transformer TR. The main controller 202 sends a controlling signal to the pulse width modulator 201 to modulate the duty cycle of the pulse width modulating signal outputted therefrom, thus a purpose of automatically regulating output voltage to meet the requirements of the electronic product during the light load operation and the non-light load condition is achieve.

The power supply device of the present invention uses signal output port for outputting output voltage with different potential levels, the topology is simple but has high usability.

Figure 5:
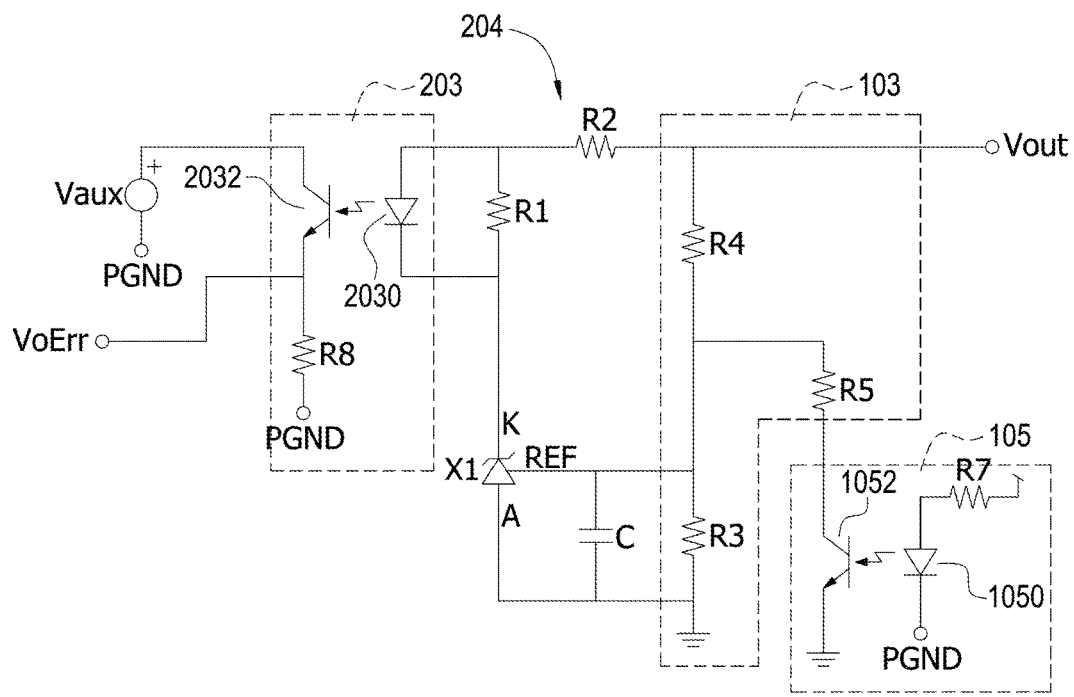
FIG. 5 is a circuit diagram illustrating the voltage-feedback unit, the voltage-dividing controller, the photo-feedback unit, and the voltage comparator of the power supply device shown in FIG. 3.

Reference is made to FIG. 3 and FIG. 5, wherein FIG. 5 is a circuit diagram illustrating the voltage-feedback unit, the voltage-dividing controller, the photo-feedback unit, and the voltage comparator of the power supply device shown in FIG. 3. The voltage comparator 204 includes a main switch X1, a first resistor R1, the second resistor R2, and a capacitor C. As can be seen in FIG. 5, the main switch X1 is a TL431 type voltage regulator, the cathode of the main switch X1 is electrically connected to the first resistor R1, and the anode thereof is electrically connected to ground. The second resistor R2 is electrically connected to the first resistor R1 and the output port Vout, and the capacitor C is across the anode and reference terminal REF of the main switch X1.

The voltage-feedback unit 103 includes a third resistor R3, a fourth resistor R4, and a fifth resistor R5. The third resistor R3 is electrically connected to the capacitor C in parallel, the fourth resistor R4 is electrically connected to the third resistor R3 and the output port Vout, and the fifth resistor R5 is electrically connected to the third resistor R3, the fourth resistor R4, and a light-receiving component 1052 of voltage-dividing controller 105. The voltage-dividing controller 105 further include a light-generating component 1050 electrically connected to the current sensor 101 through the seventh resistor R7. The voltage-dividing controller 105 is configured to switch the transistor switch Q1 on and off, and the primary side (where the primary winding Wp arranged) of the transformer TR is isolated from the secondary side (where the secondary winding Ws arranged) thereof on the path by the voltage-dividing unit 105.

The photo-feedback unit 203 includes an eighth resistor R8 and an optical isolator (its reference numeral is omitted) including a luminous component 2030 and a photosensitive component 2032 optically coupled with each other, and the luminous component 2030 is electrically connected to the first resistor R1 in parallel. As can be seen in FIG. 5, the luminous component 2030 is a light emitting diode, the photosensitive component 2032 is a phototransistor, and the emitter of the photosensitive component 2032 is electrically connected to the eighth resistor R8 and the main controller 202. The primary side of the transformer TR is isolated from secondary side thereof on the path by the photo-feedback unit 203.

With referring again to FIG. 3, when the power switch Q is switched on, the current sensor 101 senses the current flowing through the primary winding Wp, and the sensed current is then switched into a high logic signal and a low logic signal by a comparator built in the current sensor 101, wherein the high logic signal and low logic signal respectively corresponds to the light load operation and non-light load operation of the load RL. The high logic signal and low logic signal outputted from the current sensor 101 is then transmitted to the light-generating component 1050 of the voltage-dividing controller 105 through the seventh resistor R7. In particular, when the load RL is under light load operation, the high logic signal is transmitted from the current sensor 101 to the voltage-dividing controller 105 to make the light-generating component 1050 switch on. As such, the light-receiving component 1052 receives light generated by the light-generating component 1050 and then transmits a controlling signal to the voltage-feedback unit 103.

During the light-receiving component 1052 is switch on, the current flowing through the fourth resistor R4 is divided by the third resistor R3 and the fifth resistor R5. The main switch X1 is switch off and no current flowing through the first resistor R1 when the potential level drop on the reference terminal REF is lower than a preset potential level for conducting the main switch X1 . Conversely, the main switch X1 is switch on and a current flowing through the first resistor R1 and thereby lighting the luminous component2030 when the potential level drop on the reference terminal REF is equal to or higher than the preset potential level for conducting the main switch X1. The photosensitive component 2032 senses the light generated from the luminous component 2030, and sends a driving signal corresponding to the light to the main controller 202, the main controller 202 is then outputted a controlling signal to the pulse width modulator 201 according to the driving signal to the pulse width modulator 201. The pulse width modulator 201 modulated the duty cycle of the pulse width modulating signal outputted therefrom, thus the duty cycle for switching the power switch Q is modulated and thereby regulating the potential level of the output voltage transmitted form the output port Vout to the electronic product.

When the power switch Q is switched on, the current sensor 101 senses the current flowing through the primary winding Wp, and the sensed current is then switched into a high logic signal and a low logic signal by a comparator built in the current sensor 101, wherein the low logic signal and high logic signal respectively corresponds to the light load operation and non-light load operation of the load RL. The high logic signal and low logic signal outputted from the current sensor 101 is then transmitted to the light-generating component 1050 of the voltage-dividing controller 105 through the seventh resistor R7. When the load RL is under non-light load operation, the high logic signal is transmitted from the current sensor 101 to the voltage-dividing controller 105 to make the light-generating component 1050 switch on. As such, the light-receiving component 1052 receives light generated by the light-generating component 1050 and then transmits a controlling signal to the voltage-feedback unit 103. In contrast, when the load RL is under light load operation, the low logic signal is transmitted from the current sensor 101 to the voltage-dividing controller 105 to make the light-generating component 1050 switch off.

During the light-receiving component 1052 is switch on by receiving light generated by the light-generating component 1050, thereby lowering the potential level of the reference terminal REF of the main switch X1. Since the potential level for conducting the main switch X1 by the reference terminal REF is a constant, an effect equivalent to heighten the output voltage is defined during the potential level of the reference terminal REF is decreased.

During the light-receiving component 1052 does not receive light generated by the light-generating component 1050, thereby heightening the potential level of the reference terminal REF of the main switch X1 . Since the potential level for conducting the main switch X1 by the reference terminal X1 is the constant, an effect equivalent to lower the output voltage is defined during the potential level of the reference teiminal REF is decreased.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A power supply device electrically comprising an output port electrically connected to an electronic product, the power supply device comprising:
   a power source;
   a transformer comprising a primary winding and a secondary winding coupled with each other, the primary winding electrically connected to the power source, and the secondary winding electrically connected to the output port, wherein the transformer having a first inductance and a second inductance smaller than the first inductance;
   a power switch electrically connected to the primary winding and the power source;
   a current sensor electrically connected to the power switch;
   a voltage-dividing controller electrically connected to the current sensor, wherein the voltage-diving controller comprises a light-generating component and a light-receiving component, the light-generating component is electrically connected to the current sensor, and the light-receiving component is electrically connected to the voltage-feedback unit;
   a voltage-feedback unit coupled to the voltage-diving controller and the output port;
   a voltage comparator electrically connected to the voltage-feedback unit;
   a main controller electrically connected to the voltage comparator; and
   a pulse width modulator electrically connected to the power switch and the main controller,
   wherein the current sensor senses a current flowing through the primary winding to make the voltage-dividing controller generate a voltage-dividing-controlling signal for regulating a voltage outputted from the voltage-feedback unit, and the voltage comparator compares a potential level of the regulated voltage with a preset potential level, to generate a compared signal for modulating a duty cycle of the pulse width modulating signal outputted from the pulse width modulator, thus an output voltage from the output port is regulated.

2. The power supply device of claim 1, wherein the voltage comparator comprising a main switch, a first resistor, a second resistor, and a capacitor, the main switch is electrically connected to the first resistor and the capacitor, and the second resistor is electrically connected to the first resistor and the output port.

3. The power supply device of claim 1, wherein the voltage-feedback unit comprises a transistor switch, a third resistor, a fourth resistor, a fifth resistor, and a sixth resistor, the third resistor is electrically connected to the capacitor in parallel, the fourth resistor is electrically connected to the transistor switch and the output port, the fifth resistor is electrically connected to the transistor switch, the current sensor, and the output port, the sixth resistor is electrically connected to the third resistor and the fourth resistor.

4. The power supply device of claim 2, wherein the voltage-feedback unit comprises a third resistor, a fourth resistor, and a fifth resistor, the third resistor is electrically connected to the capacitor in parallel, the fourth resistor is electrically connected to the third resistor and the output port, and the fifth resistor is electrically connected to the third resistor and the fourth resistor, and coupled to the current sensor.

5. The power supply device of claim 1, further comprising a photo-feedback unit arranged between the voltage comparator and the main controller, the photo-feedback unit comprises a luminous component and a photosensitive component, the luminous component is electrically connected to the voltage comparator, and the photosensitive is electrically connected to the main controller.

6. The power supply device of claim 2, wherein the main switch is a TL431 voltage regulator family.

7. The power supply device of claim 1, wherein the transformer further comprises a magnetic core, the magnetic core comprising two opposite end faces slightly spaced from one another to define an air gap therebetween, and the primary winding and the secondary winding are wound on the magnetic core.

8. The power supply device of claim 7, wherein the air gap is a stepped air gap.

9. The power supply device of claim 1, further comprising:
　　a rectifier electrically connected to the secondary winding; and
　　a filter electrically connected to the rectifier and the output port.

* * * * *